United States Patent
Xu et al.

(10) Patent No.: US 11,636,499 B2
(45) Date of Patent: *Apr. 25, 2023

(54) QUANTITATIVE RATING SYSTEM FOR PRIORITIZING CUSTOMERS BY PROPENSITY AND BUY SIZE

(71) Applicant: Adobe Inc., San Jose, CA (US)

(72) Inventors: Jin Xu, San Jose, CA (US); Zhenyu Yan, Cupertino, CA (US); Wenqing Yang, Santa Clara, CA (US); Tianyu Wang, San Jose, CA (US); Abhishek Pani, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,818

(22) Filed: Jan. 18, 2022

(65) Prior Publication Data
US 2022/0138781 A1      May 5, 2022

Related U.S. Application Data

(63) Continuation of application No. 16/042,770, filed on Jul. 23, 2018, now Pat. No. 11,263,649.

(51) Int. Cl.
*G06Q 30/0202*     (2023.01)
*G06Q 30/0204*     (2023.01)

(52) U.S. Cl.
CPC ..... *G06Q 30/0202* (2013.01); *G06Q 30/0204* (2013.01)

(58) Field of Classification Search
CPC .................. G06Q 30/0202; G06Q 30/0204
See application file for complete search history.

(56) References Cited

U.S. PATENT DOCUMENTS

| | | | |
|---|---|---|---|
| 10,417,650 B1 * | 9/2019 | Gong | G06Q 30/0202 |
| 11,263,649 B2 * | 3/2022 | Xu | G06Q 30/0204 |

(Continued)

FOREIGN PATENT DOCUMENTS

| | | |
|---|---|---|
| CA | 2998249 | 9/2018 |
| WO | 2014100588 | 6/2014 |

OTHER PUBLICATIONS

"Back to Basics What is Look-alike modeling?", https://www.lotame.com/back-basics-look-alike-modeling/, May 6, 2018, 11 pages.
"Final Office Action", U.S. Appl. No. 16/042,770, dated May 25, 2021, 12 pages.

(Continued)

*Primary Examiner* — Dylan C White
(74) *Attorney, Agent, or Firm* — FIG. 1 Patents

(57) ABSTRACT

Quantitative rating systems and techniques are described that prioritize customers by propensity to buy and buy size to generate customer ratings. In one example, a propensity model is used to determine a likelihood of a potential customer to purchase a product, and a projected timeframe buy size for the potential customer is determined. An expected value for the potential customer is generated by combining the likelihood of the potential customer to purchase the product and the projected timeframe buy size. In another example, a ratio model of annualized recurring revenue (ARR) is used to determine a timeframe buy size for an existing customer in consecutive time frames. An upsell opportunity for the existing customer is determined based on the timeframe buy size less an ARR for a current time frame for the existing customer. A rating of the potential or existing customer is output in a user interface.

20 Claims, 8 Drawing Sheets

(56) References Cited

U.S. PATENT DOCUMENTS

| | | | |
|---|---|---|---|
| 11,403,652 B1* | 8/2022 | Growitz | G06Q 30/0202 |
| 2002/0069244 A1 | 6/2002 | Blair et al. | |
| 2008/0306820 A1 | 12/2008 | Passmore | |
| 2013/0096984 A1 | 4/2013 | Lawton et al. | |
| 2014/0172560 A1 | 6/2014 | Satyavolu et al. | |
| 2014/0358634 A1 | 12/2014 | Schnabl et al. | |
| 2015/0170175 A1 | 6/2015 | Zhang et al. | |
| 2015/0220951 A1 | 8/2015 | Kurapati et al. | |
| 2016/0180358 A1 | 6/2016 | Battista | |
| 2016/0224987 A1 | 8/2016 | Hersh et al. | |
| 2016/0239924 A1 | 8/2016 | Fields et al. | |
| 2017/0061480 A1* | 3/2017 | Zhou | G06Q 30/0201 |
| 2017/0236131 A1 | 8/2017 | Nathenson et al. | |
| 2018/0211268 A1 | 7/2018 | Zhou et al. | |
| 2018/0218383 A1* | 8/2018 | Shen | G06Q 10/06315 |
| 2018/0285957 A1* | 10/2018 | Ng | G06N 5/003 |
| 2018/0361253 A1 | 12/2018 | Grosso | |
| 2018/0365715 A1 | 12/2018 | Malhotra et al. | |
| 2019/0005514 A1 | 1/2019 | Chowdhary et al. | |
| 2019/0266622 A1* | 8/2019 | Turnbull | H04W 4/029 |
| 2020/0027102 A1 | 1/2020 | Xu et al. | |

OTHER PUBLICATIONS

"Final Office Action", U.S. Appl. No. 16/042,770, filed Oct. 7, 2020, 9 pages.

"First Action Interview Office Action", U.S. Appl. No. 16/042,770, filed Aug. 28, 2020, 3 pages.

"Lasso, Ridge, and El—Inside Bloomberg", Retrieved at: https://www.youtube.com/watch?v=Kloz_aa1ed4, 1 page.

"Non-Final Office Action", U.S. Appl. No. 16/042,770, filed Jan. 19, 2021, 15 pages.

"Notice of Allowance", U.S. Appl. No. 16/042,770, filed Oct. 15, 2021, 11 pages.

"Pre-Interview First Office Action", U.S. Appl. No. 16/042,770, filed Mar. 24, 2020, 3 pages.

Arora, Shabana, "Recommendation Engines: How Amazon and Netflix are Winning the Personalization Battle", Martech Advisor Blog [retrieved Jan. 20, 2021]. Retrieved from the Internet <https://www.martechadvisor.com/articles/customer-experience-2/recommendation-engines-how-amazon-and-netflix-are-winning-the-personalization-battle/>., Jun. 28, 2016, 8 pages.

Hardesty, Larry, "The history of Amazon's recommendation algorithm", Amazon.science.com [retrieved Jan. 20, 2021]. Retrieved from the Internet <https://www.amazon.science/the-history-of-amazons-recommendation-algorithm>., Jan. 19, 2021, 13 pages.

* cited by examiner

500
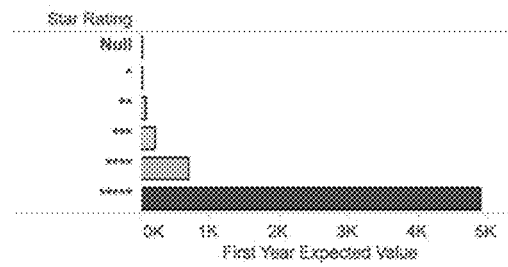
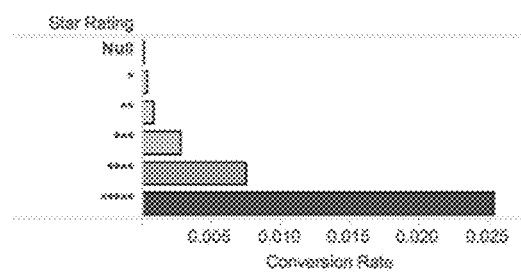
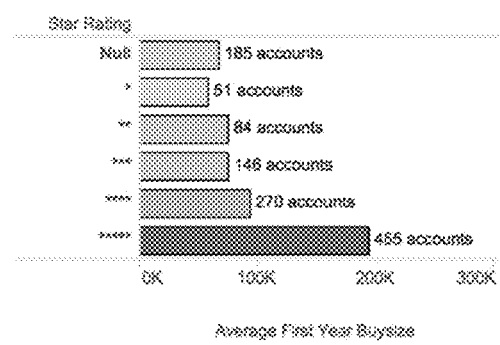
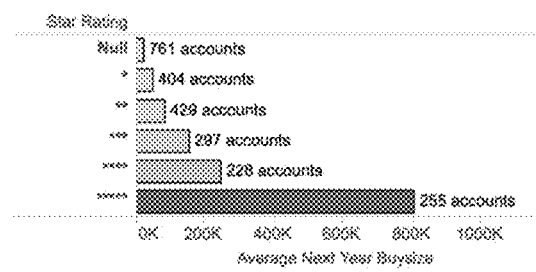
Fig. 5

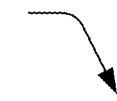

700

702
Determine a timeframe buy size for an existing customer using a ratio model of annualized recurring revenue (ARR) of the existing customer for consecutive time frames

704
Determine an upsell opportunity for the existing customer based on the determined timeframe buy size less an ARR for a current timeframe for the existing customer

706
Determine a rating for the existing customer based on the upsell opportunity of the existing customer

708
Output the rating of the existing customer indicating the upsell opportunity of the existing customer

*Fig. 7*

QUANTITATIVE RATING SYSTEM FOR PRIORITIZING CUSTOMERS BY PROPENSITY AND BUY SIZE

RELATED APPLICATIONS

This application is a continuation of and claims priority to U.S. patent application Ser. No. 16/042,770, filed Jul. 23, 2018, entitled "Quantitative Rating System for Prioritizing Customers by Propensity and Buy Size", the entire disclosure of which is hereby incorporated by reference herein in its entirety.

BACKGROUND

Optimizing time and resources of marketing and sales teams can be a difficult challenge for the providers of products and services. For instance, the provider of a product or service may need to delegate duties of sales and marketing teams based on whether customers are existing customers who have already purchased a product or service, or potential customers who have not yet purchased a product or service. Furthermore, the provider of a product or service wants to devote more time and resources to both potential and existing customers who are most likely to purchase a product or service, rather than those customers who are unlikely to purchase a product or service. Once potential and existing customers who are most likely to purchase a product or service are identified, providers of the product or service typically attempt to allocate the respective accounts of the customers amongst sales and marketing teams efficiently and fairly.

Challenges arise when the resource allocation for potential and existing customer accounts are implemented by conventional business resource allocation computing systems. For example, these conventional business resource allocation systems rely upon users to enter criteria and differentiate important factors from trivial factors for the products or services and the potential and existing customers. Manually entering this information in conventional business resource allocation systems lends itself to human bias, which can negatively affect business outcomes including unbalanced accounts to individuals on sales and marketing teams. In particular, the conventional business resource allocation systems cannot correct for the human bias present when, for instance, a user in charge of account allocation assigns the most lucrative accounts to the user's friend rather than a sales representative who is most likely to convert on the account.

Further challenges exist in implementing these conventional business resource allocation systems when different products and services need to be scaled up. The inherent human bias present when accounts are allocated using conventional business resource allocation systems results in inaccurate and inefficient translations of metrics to new or different products and services. Therefore, these conventional, manual techniques result in inefficient use of computing resources and thus operation of a computing device that implements these conventional systems, when the inherent human bias of conventional systems is translated to different products and services.

SUMMARY

Quantitative rating systems and techniques are described that prioritize customers by propensity to buy and buy size to generate customer ratings. These techniques overcome the limitations of conventional systems that utilize manual inputs of criteria and importance of various factors related to products and services, at a significant cost in operational performance of a computing device. In a first example, a propensity model is used to determine a likelihood of a potential customer to purchase a product. A propensity model correlates characteristics and qualities of a customer with anticipated behaviors, or "propensities." Propensity models utilize data about customers and different segmentations that apply to the customers to provide predictions on how the customers will behave.

Additionally, a projected timeframe buy size for the potential customer is determined that includes an estimated annualized recurring revenue (ARR) for the potential customer. The projected timeframe buy size is an estimation of a number of products or services that a customer will purchase during the given timeframe. The estimated ARR for the potential customer is an estimated subscription economy metric that shows money that comes in each timeframe for the life of a subscription or contract, and is based on a value of the recurring components associated with the potential customer normalized over the projected timeframe. Then, an expected value for the potential customer is generated by combining the likelihood of the potential customer to purchase the product and the projected timeframe buy size. A rating of the potential customer is output in a user interface, thus displaying a limited set of information to a user in a specific manner.

For instance, the rating of the potential customer summarizes significant amount of information regarding the propensity of the potential customer to purchase a product and the estimated buy size of the potential customer in a particular manner, such as a symbol rating, that is easy for users to comprehend. Furthermore, the rating of the potential customer provides a limited set of data in the user interface that corresponds to products targeted towards the potential customer while omitting products that are not targeted towards the potential customer. Thus, these techniques increase user and computational efficiency of quantitative rating systems over conventional techniques.

In another example, a ratio model of annualized recurring revenue (ARR) is used to determine a timeframe buy size for an existing customer in consecutive timeframes. Next, an up sell opportunity for the existing customer is determined by subtracting an ARR for a current timeframe for the existing customer from the determined timeframe buy size. A rating of the existing customer indicating the upsell opportunity of the existing customer is output in a user interface therefore displaying a limited set of information to a user in a specific manner.

Similar to the rating of the potential customer, the rating of the existing customer summarizes information regarding the propensity of the existing customer to purchase a product and the estimated buy size of the existing customer in a particular manner, such as a symbol rating. Additionally, the rating of the existing customer provides a limited set of data in the user interface such as by omitting analysis of products that the existing customer has already purchased, for example. The quantitative ratings of potential and existing customers provide data-driven recommendations with little to no interference of human bias, while providing flexibility of scaling-up features and aggregating multiple products in a single recommendation with increased computational efficiency over conventional manual techniques. By removing the interference of human bias from sales and marketing account allocation, the techniques described herein provide improvements in computer technology that previously were subject to biased human inputs.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 5 depicts validation plots of quantitative ratings systems and techniques described herein for prioritizing customers by propensity to buy and buy size.

FIG. 7 is a flow diagram depicting a procedure in an example implementation in which a rating of an existing customer is output indicating an expected value of the existing customer in a user interface by a quantitative customer rating system.

DETAILED DESCRIPTION

Overview

Figure 1:
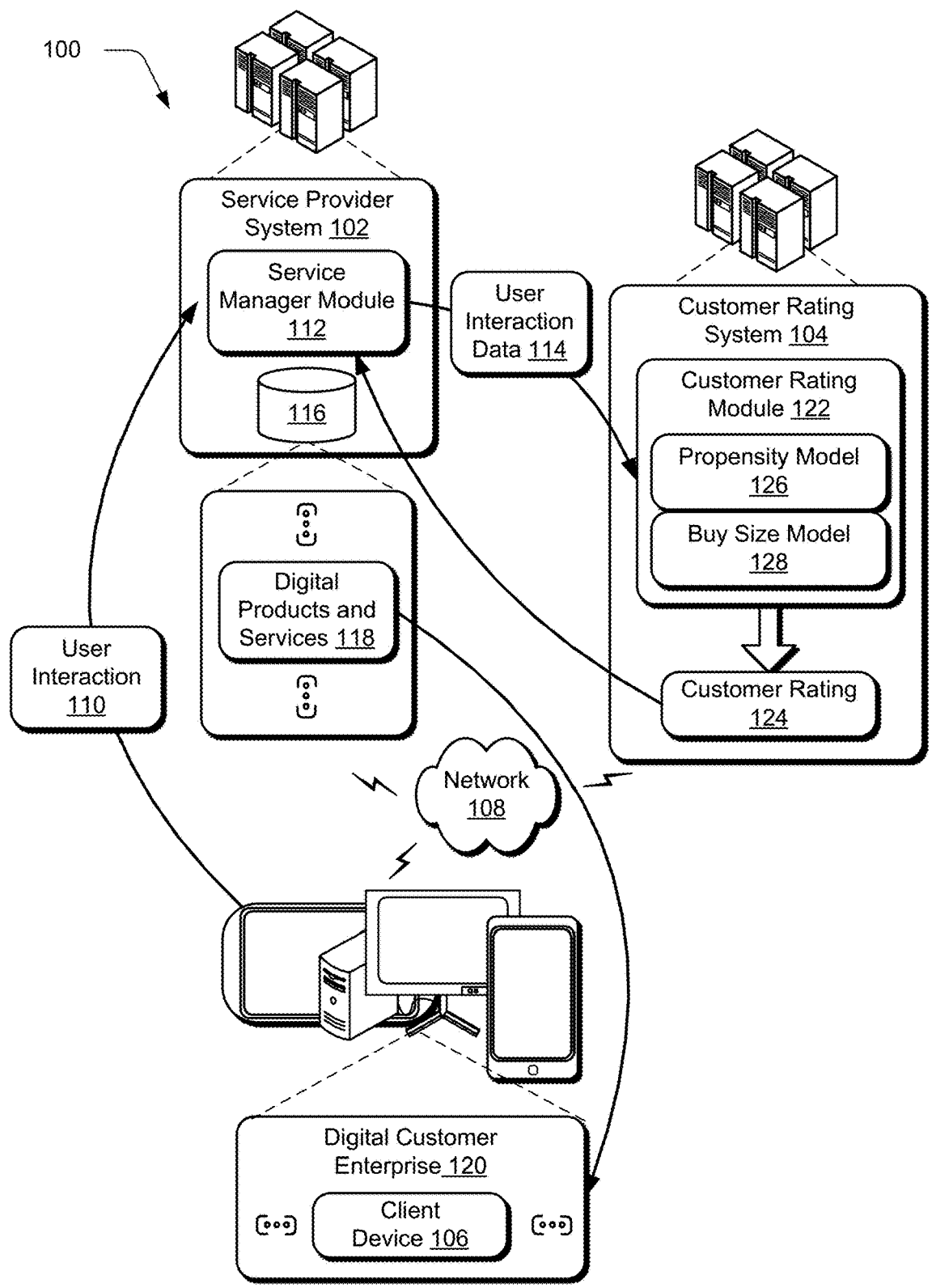
FIG. 1 is an illustration of an environment in an example implementation that is operable to employ quantitative rating system techniques described herein.

Conventional business resource allocation systems that provide recommendations on sales and marketing resource allocation typically rely upon manually setting criteria (e.g., region size, industry type, customer employee count, etc.) and manually differentiating important factors for the criteria from trivial factors in order to allocate resources. Challenges arise when these criteria and factors are manually determined and input into conventional business resource allocation systems. For example, the manual nature of inputting information into these conventional systems results in human bias towards customers for the products or services and/or towards individuals on the sales and marketing teams, resulting in imbalances on these allocations.

Manually entering this information into conventional business resource allocation systems by a user may be biased based on insufficient knowledge of the complexity of a product being sold and favoritism towards a particular individual on a sales team. The conventional business resource allocation systems do not account for this human bias, nor do they provide alternative means for account allocation that prevents human bias as a negatively impacting factor when accounts are allocated. This not only leads to disproportionate and inefficient allocations of accounts on sales and marketing teams, but also makes it difficult to predict how increased sales volume or a new product, for example, will affect future business.

Accordingly, techniques are described in which quantitative ratings are provided by a computing device which prioritize customers by propensity to buy and buy size. The challenges described above in relation to conventional business resource allocation systems are overcome by using data-driven decision making, taking into consideration both customers and individual products and services. For potential customers, a quantitative rating system implemented by the computing device determines a likelihood of a potential customer to purchase a product or service. The likelihood of the potential customer to buy the product or service is represented in part by a propensity to buy of the potential customer. The propensity to buy can be defined as a tendency to purchase or convert on the product or service that correlates to the particular customer. Buying, purchasing, or otherwise converting on the product or service may include ordering the product or service from a website, subscribing to the product or service from an online retailer, performing a transaction to purchase the product or service in a physical retail location, or any other means for transferring ownership of the product or service from the provider of the product or service to the customer. The computing device determines the propensity to buy based on a propensity model by correlating characteristics of the potential customer with propensities of customer behavior of a customer segment to which the potential customer is a part of. The propensity model may be a logistic regression with a penalized term or a random forest model, to name a few examples.

A projected timeframe buy size for the potential customer is also determined by the computing device, by estimating an annualized recurring revenue (ARR) for the potential customer. The estimated ARR for the potential customer is based on value of recurring components associated with the potential customer that are normalized over the projected timeframe. Recurring components may include subscriptions, contracts, or repeating purchases, for instance. A timeframe for the projected timeframe buy size may be, for example, a first year following the potential customer purchasing the product or service. The buy size can be defined as a quantity of the product or service that the potential customer is likely to purchase during a first timeframe. A look-alike model may be used to generate a timeframe buy size prediction for a potential customer.

The computing device then combines the likelihood of the potential customer to purchase the product or service and the timeframe buy size to generate an expected value for the potential customer. The expected value represents a quantitative prediction for the potential customer with significantly less human bias than is present in conventional systems. The computing device also rates the potential customer based on the expected value, such as by comparing the expected value of the potential customer to different rating threshold quantities. The rating of the potential customer is then output in a user interface of the computing device, which indicates the expected value of the potential customer in a specific manner.

For existing customers, the computing device of the quantitative rating system determines a likelihood of existing customers to upgrade current products or services, or buy, purchase, or convert on additional products or services. To do so, the computing device determines a timeframe buy size for an existing customer using a ratio model of ARR for consecutive time frames of the existing customer. A timeframe for the timeframe buy size may be, for example, a year following the existing customer purchasing the product or service. Accordingly, the consecutive time frames used for the ratio model of ARR may be, for instance, two consecutive years, although other time frames are also contemplated. The buy size in this case can be defined as a quantity of the product or service that the existing customer is likely to purchase in a subsequent timeframe. In some cases, the buy size for an existing customer can exclude the products or services that the existing customer has already purchased if repeat purchases are inapplicable to the particular product or service, such as multiple copies of a single magazine subscription. However, in other cases, the buy size for the existing customer can include the products or services that the existing customer has already purchased if repeat purchases are applicable to the particular product or service, such as a monthly dog food delivery.

The computing device determines an upsell opportunity for the existing customer by subtracting an ARR for a current time frame for the existing customer from the determined timeframe buy size. In an example where the time frames are equal to one year, the upsell opportunity may represent a next-year buy size minus a current-year ARR. Next, the computing device outputs a rating of the existing customer that indicates the upsell opportunity of the existing customer in a specific manner in a user interface. Both the rating of the potential customer and the rating of the existing customer may be output in the user interface using, for instance, a star rating generated by comparing the determined ratings of the respective customers to thresholds for different star amounts. The ratings for the respective customers may also be combined with ratings for additional products or services to generate overall ratings for multiple products and services for a particular customer.

In this way, both existing customers and potential customers are prioritized quantitatively in an easy to understand manner without the human bias present in conventional business resource allocation systems. Specifically, prioritizing potential and existing customers in a data-driven manner overcomes the challenges presented by conventional systems which allowed human bias to be applied in manual inputs relating to both products and services, and to customers, when allocating accounts amongst sales and marketing teams. The quantitative rating system additionally provides flexibility not present in conventional systems for aggregating multiple products or services into a single rating for existing and potential customers. The ratings are output in a specific manner in a user interface of a computing device and represent a limited set of information that is specific to the customer being evaluated and products or services that apply in the circumstances of the particular customer. The techniques described herein improve accuracy in generating quantitative ratings of existing and potential customers by eliminating or reducing human bias, and thus improve operational efficiency of a computing device that employs these techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Term Examples

"Digital products and services" refers to products or tools that can generally be created once and then sold or otherwise provided to multiple customers many times. Digital products and services can be delivered digitally to customers, such as over a network. Digital products and services may be configured to allow access to multiple users through a single license to use the digital products and services, such as in a workplace having multiple employees. Digital products and services may include digital content, which includes any type of data that is configured to be rendered for output by an output device of a computing device to a user. Examples of digital content include digital images, digital audio, digital media, digital video, digital articles, digital text, and so forth.

"Potential customers" refer to any entity that is not yet a recipient of digital products and/or services marketed by a provider. Potential customers may range from a single individual user to a customer enterprise having dozens or hundreds of individual users.

"Existing customers" refer to any entity that is already receiving one or more digital products and/or services from a provider. Existing customers may also range from a single individual user to a customer enterprise having dozens or hundreds of individual users.

"Logistic regression" or "logistic regression model" refers to a statistical model with an independent variable input and a binary variable output, where a unit change in the input multiplies the odds of the two possible outputs by a constant factor. Adding a penalized term to a logistic regression model controls properties of the regression coefficients beyond what the measure of fit of the logistic regression model does alone.

"Random forest model" is an ensemble learning method for classification, regression, or other tasks that operates by constructing a multitude of decision trees at training time and outputting the class that is the mode of input classes, or a mean prediction of the individual trees.

"Look-alike model" refers to the use of data enrichment to expand a set of attributes that are used to create a modeled audience. Using data associated with third-parties, a smaller seed audience of customers can be enriched with added attributes.

"Ratio model" refers to the ratio of means of two random variables. Ratio models are statistically biased and asymmetrical. Elastic net regression applied to a ratio model fits the ratio model by linearly combining penalties of the model.

Example Environment

FIG. 1 is an illustration of a digital medium environment 100 in an example implementation that is operable to employ techniques for quantitative ratings for prioritizing customers by propensity and buy size as described herein. The illustrated environment 100 includes a service provider system 102, a customer rating system 104, and a plurality of client devices, an example of which is illustrated as client device 106. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the customer rating system 104 and as further described in FIG. 8.

The client device 106 is illustrated as engaging in user interaction 110 with a service manager module 112 of the service provider system 102. The service provider system 102, for instance, may be configured to support user interaction with digital products and services 118. User interaction data 114 is then generated (e.g., by the service manager module 112) that describes this user interaction 110, which may be stored in a storage device 116 along with the digital products and services 118 themselves.

The digital products and services 118 may take a variety of forms and thus user interaction 110 with the digital products and services 118 may also take a variety of forms. For example, the client device 106 may be part of a digital customer enterprise 120 that maintains a subscription to one or more of the digital products and services 118. Once subscribed to the digital products and services 118, the digital customer enterprise 120 allows the computing device 106 to interact with the digital products and services such as digital content and functionalities associated with the digital products and services. Digital content included with the digital products and services 118 may take a variety of forms, such as electronic messages, email, banner ads, posts, and so forth. One specific example of digital products and services 118 are those digital products included in the Adobe® Marketing Cloud, such as Adobe® Advertising Cloud, Adobe® Analytics, Adobe® Primetime, Adobe® Target, and so forth, which may be provided to individual computing devices 106 through the digital customer enterprise 120. In another example, the client device 106 may obtain access to the digital products and services 118 individually without the digital customer enterprise 120.

The user interaction data 114 is received by a customer rating module 122 of the customer rating system 104, which employs this data to provide customer ratings 124 with regards to propensity to buy and buy size of the digital products and services 118. The digital products and services 118 may then be presented to potential and/or existing customers, such as the digital customer enterprise 120, based on the customer ratings 124. For instance, the digital products and services 118 are output to the computing device 106 of the digital customer enterprise 120 directly via the network 108 or indirectly via the service provider system 102 by the service manager module 112. The customer rating 124, for example, may be configured to specify one or multiple digital products and services 118 which are likely to be purchased by a potential or existing customer such as the digital customer enterprise 120. The customer rating 124 may also be used to allocate an account for a potential or existing customer, such as the digital enterprise network 120, to one or more sales or marketing representatives in an unbiased and data-driven manner.

In order to generate the customer rating 124, the customer rating module 122 includes a propensity model 126, which may be configured as a random forest model and/or a logistic regression model with a penalized term, to name a few examples. The propensity model 126 utilizes the user interaction data 114 associated with a potential or existing customer being analyzed, such as the digital customer enterprise 120, and third-party data to determine a propensity to buy for the potential or existing customer. To do so, the propensity model correlates characteristics of the customer being analyzed with propensities of customer behavior of a customer segment to which the customer being analyzed belongs.

The customer rating module 122 also includes a buy size model 128. When analyzing a potential customer, the buy size model 128 may be configured as a look-alike model to generate a prediction of buy size based on the user interaction data 114 of the potential customer compared to other customers. When analyzing an existing customer, the buy size model 128 may be configured as a ratio model applied together with elastic-net regression to predict buy size for the existing customer based on the user interaction data 114 for the existing customer. The customer rating module 122 combines the propensity to buy output using the propensity model 126 with the buy size output using the buy size model 128 to determine the customer rating 124 for potential and/or existing customers. The customer rating 124 presents the combination of the propensity to buy and buy size for potential and existing customers in an easy-to-understand manner, which was not possible with conventional techniques that simply provided bare data to users to rank customers and allocate accounts.

Figure 2:
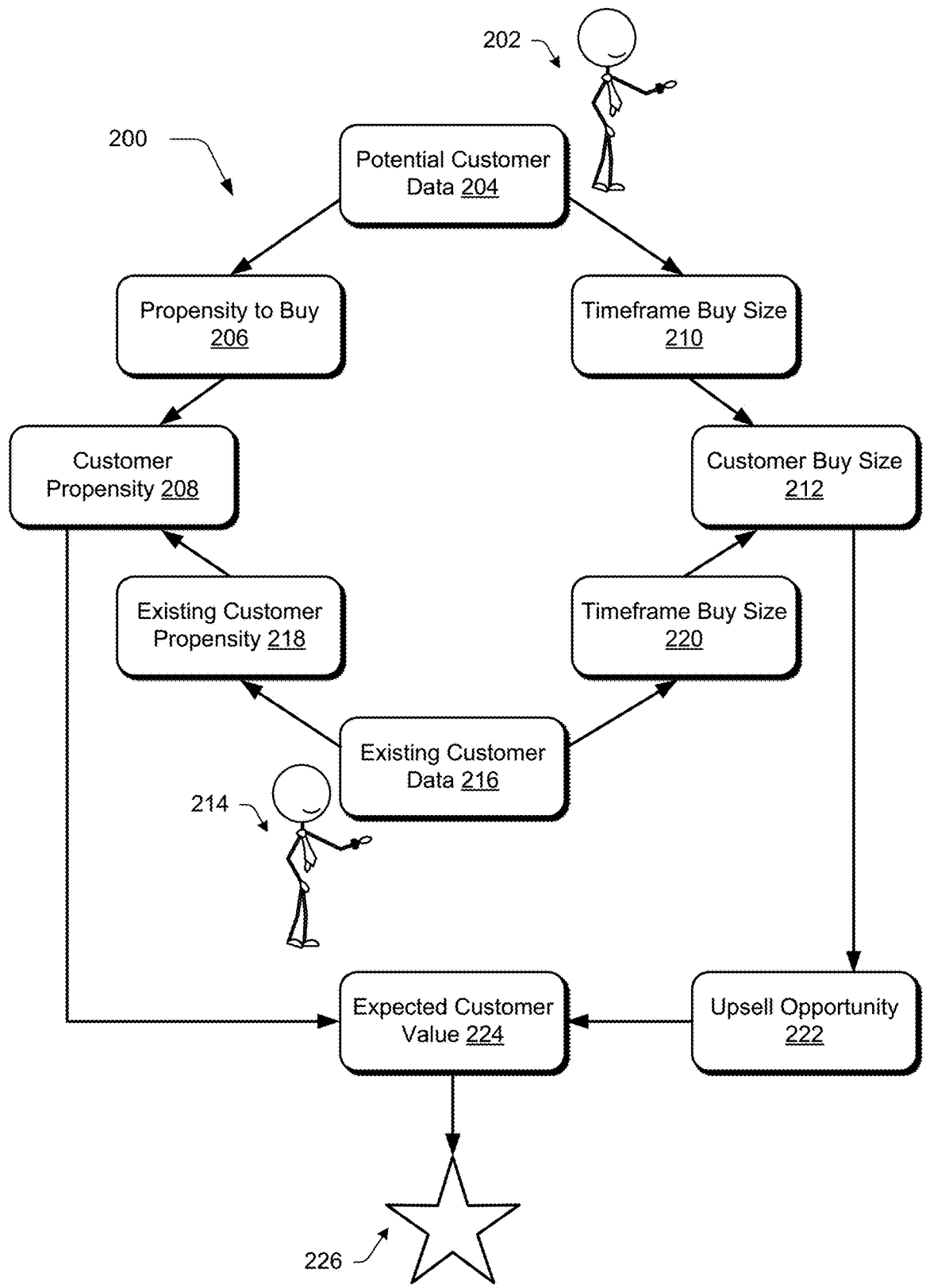
FIG. 2 depicts a system in an example implementation of utilizing existing customer data and/or potential customer data to derive an expected customer value and quantitative customer rating using the techniques described herein.

Turning now to FIG. 2, a system 200 is depicted in which existing customer data and/or potential customer data is used to derive an expected customer value and quantitative customer rating. For a potential customer 202, potential customer data 204 is obtained, such as from the user interaction data 114 of FIG. 1. The potential customer 202 may be a digital customer enterprise, such as a business or academic group of users, a team of users, or an individual user. The potential customer data 204 is used to determine a propensity to buy 206 for the potential customer 202. The propensity to buy 206 is the likelihood of the potential customer 202 to buy, purchase, or convert on one or more products or services. The propensity to buy 206 may be determined using a propensity model such as a random forest model or logistic regression with a penalized term, for example. The propensity model correlates characteristics of the potential customer 202 with propensities of customer behavior of a customer segment to which the potential customer belongs. A value determined by the propensity model for the propensity to buy 206 may be used as a customer propensity 208 representative of the potential customer 204.

The potential customer data 204 is also used to determine a timeframe buy size 210 for the potential customer. In one example, a timeframe represented by the timeframe buy size 210 is one year, although other timeframes are also considered, such as one month, one week, multiple weeks, months, or years, and so forth. In one example, the timeframe buy size 210 represents an estimation of a probable timeframe annualized recurring revenue (ARR), which may be determined by comparing the potential customer 202 to other, similar customers, such as by using a look-alike model as described in relation to the buy size model 128 above. The ARR for the potential customer is based on value of recurring components associated with the potential customer that are normalized over the timeframe. In calculating the timeframe buy size 210, it may be assumed that the potential customer 202 purchases the product or service being evaluated in the upcoming timeframe. A value determined by the buy size model for the timeframe buy size 210 may be used as a customer buy size 212 for the potential customer 202.

For an existing customer 214, existing customer data 216 is obtained, such as from the user interaction data 114 of FIG. 1. The existing customer 214 may also be a digital customer enterprise, such as a business or academic group of users, a team of users, or an individual user. The existing customer data 216 is used to determine an existing customer propensity 218 for the existing customer 214. The existing customer propensity 218 is the likelihood of the existing customer 214 to buy, purchase, or convert on one or more products or services. Because the existing customer 214 has already purchased a product or service, however, the existing customer propensity 218 may be assumed to be true without taking churn probability into account for simplicity. Therefore, the existing customer propensity 218 may be regarded as 1, and this value may then be used as the customer propensity 208 for the existing customer 214.

The existing customer data 216 is also used to determine a timeframe buy size 220 for the existing customer. As discussed above, a timeframe represented by the timeframe buy size 220 may be one year, although other timeframes are also considered, such as one month, one week, multiple weeks, months, or years, and so forth. The timeframe buy size 220 may be determined by predicting a probable timeframe ARR using the buy size model 128 described above. For example, the timeframe ARR may be determined using a ratio model applied with elastic-net regression, where the output is a ratio of ARR for two consecutive timeframes. A value determined by the buy size model for the timeframe buy size 220 may be used as a customer buy size 212 for the existing customer 214.

The customer buy size 212 for the potential customer 202 and the existing customer 214 are used to determine an upsell opportunity 222, which is equal to the customer buy size 212 less a current timeframe ARR for the customer being evaluated. Because the potential customer 202 has not yet purchased the product or service, the current timeframe ARR for the potential customer can be considered 0, thus the upsell opportunity 222 for the potential customer is equal to the timeframe buy size 210. The upsell opportunity 222 and the customer propensity 208 are combined to determine an expected customer value 224, such as by multiplying the customer propensity and the upsell opportunity. The expected customer value 224 can then be compared to various threshold values to determine a rating 226 for the potential customer 202 or the existing customer 214, which when output in a user interface gives users a visual indication of the value of the particular customer.

Figure 3:
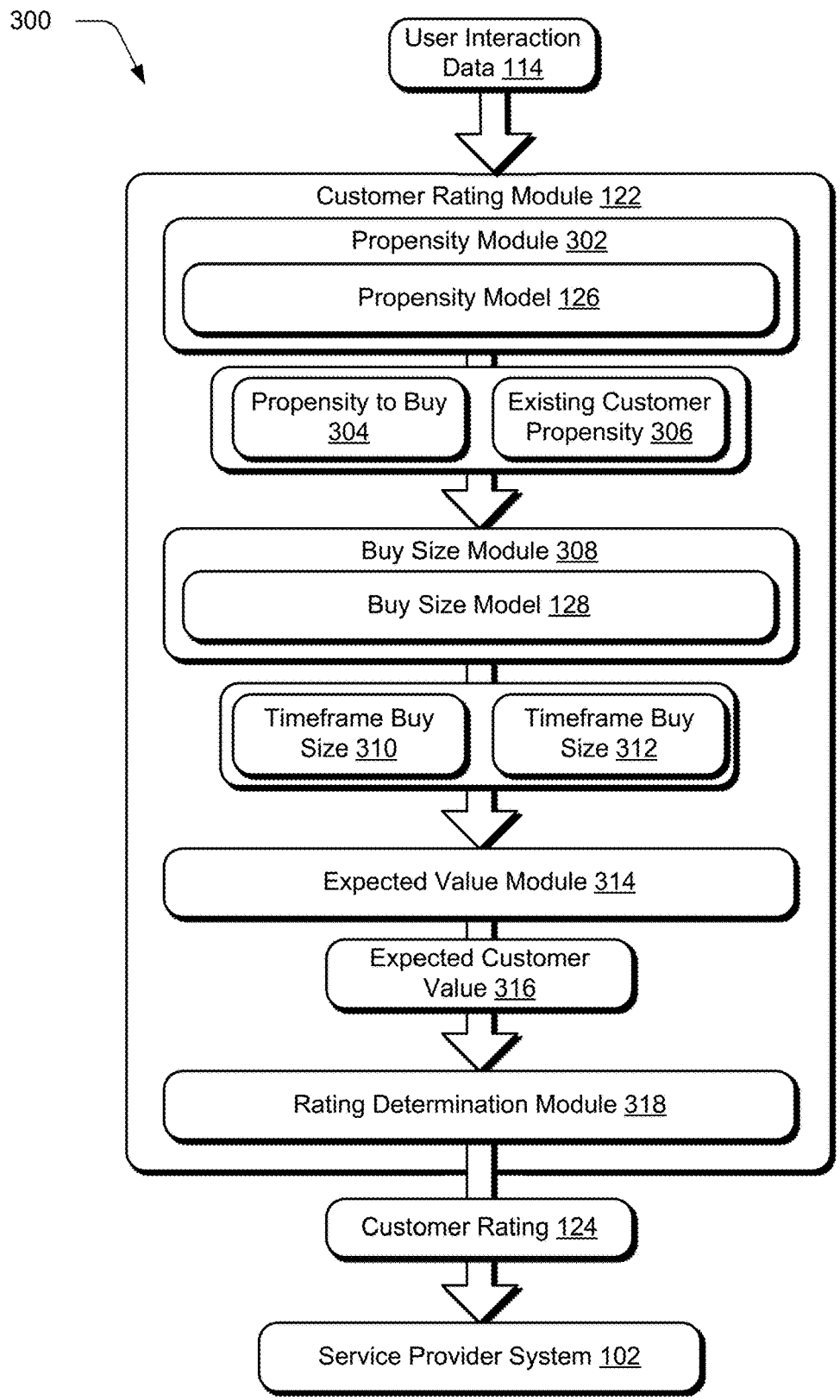
FIG. 3 depicts a system in an example implementation showing operation of the quantitative rating system of FIG. 1 in greater detail.

FIG. 3 depicts a system 300 showing operation of the customer rating module 122 of FIG. 2 in greater detail. In this example, the customer rating module 122 includes a propensity module 302 that is configured to determine a propensity to buy 304 for a potential customer, and/or an existing customer propensity 306 for an existing customer. To do so, the propensity module 302 utilizes the propensity model 126 and various components of the user interaction data 114. In the case of a potential customer, the propensity module 302 is based on a current timeframe ARR using the following:

$$y = \begin{cases} 1 & ARR_{current\ time\ frame} > 0 \\ 0 & \text{otherwise} \end{cases}$$

Where y is the response variable of the propensity model 126, representing a likelihood of the potential customer to purchase the product or service by comparing firmographic data for the potential customer to data for third-parties. The firmographic data includes descriptive attributes for the potential customer that can be used to aggregate the potential customer into meaningful market segments. The firmographic data and/or the data for third parties may be included in the user interaction data 114. As discussed above, the propensity model 126 may be a random forest model or utilize logistic regression with a penalized term, to name a few examples. Thus, the propensity model 126 correlates characteristics of the potential customer found in the firmographic data to data for third parties, where the data for third parties can be selected from a market segment that includes the potential customer.

The propensity to buy 304 corresponds to the response variable of the propensity model 126, and is usually less than one. For an existing customer, the existing customer propensity 306 is regarded as one because the customer has already purchased a product or service, and churn probability is not considered for simplicity. The propensity to buy 304 and the existing customer propensity 306 is thus represented by the following:

Propensity to Buy =

$$\begin{cases} \text{Estimated via propensity model} & \text{potential customers} \\ 1 & \text{existing customers} \end{cases}$$

Next, a buy size module 308 determines either a timeframe buy size 310 for a potential customer, or a timeframe buy size 312 for an existing customer. To do so, the buy size module 308 determines a timeframe buy size 310 for a potential customer, which represents an estimation of a probable timeframe ARR for the potential customer. Estimating the ARR for the potential customer is based on a value of recurring components, such as subscriptions, contracts, or repeating purchases, associated with the potential customer that are normalized over the timeframe. Assuming that the potential customer will purchase a product or service in an upcoming timeframe, the buy size module 308 uses the buy size model 128 to analyze data associated with the potential customer and other customers, such as from the user interaction data 114. As discussed above, the buy size model 128 may be a look-alike model when evaluating a potential customer, in order to compare the potential customer to other customers having similar characteristics.

The buy size module 308 may also account for age of the potential customer as time goes on in generating the timeframe buy size 310. For example, the buy size module 308 can assume that age of a customer has an increasing effect on ARR. Therefore, the buy size model 128 can be constructed to reflect the increasing effect of age on ARR, such that:

$$\text{Potential}_{ARR} = \beta_0 + \beta_1 x_1 + \ldots + \beta_i age_0 + \beta_n x_n + \lambda(\alpha \|\beta\|_1 + (1-\alpha)\|\beta\|_2)$$

$$\text{Max}_{ARR} = \beta_0 + \beta_1 x_1 + \ldots + \beta_i age + \beta_n x_n + \lambda(\alpha \|\beta\|_1 + (1-\alpha)\|\beta\|_2)$$

Where $age_0$ is equal to zero and age is a length of time (e.g., years) a given customer has used the given product.

Further, $\text{Max}_{ARR} = \max(\text{Potential}_{ARR}, \text{Last}_{ARR})$, where $\text{Potential}_{ARR}$ is a first timeframe ARR when existing customers first buy a product or service, and $\text{Last}_{ARR}$ is a most recent active ARR for existing customers. In a prediction stage, age is set to zero to represent timeframe buy size for potential customers.

For an existing customer, the buy size module 308 determines the timeframe buy size 312 which represents a prediction of a probable timeframe ARR for a next, or subsequent, timeframe. The buy size model 128 for existing customers is a ratio model applied together with elastic-net regression, where the response variable is a ratio of ARR in two consecutive timeframes for the existing customer. For existing customers, the buy size model can be expressed as:

$$\log\left(\frac{ARR_{current\_year}}{ARR_{last\_year}}\right) = \beta_0 + \beta_1 x_1 + \ldots + \beta_n x_n + \lambda(\alpha\|\beta\|_1 + (1-\alpha)\|\beta\|_2)$$

Here, $x_i$ variables represent features of the existing customer, and $\lambda$, $\alpha$ are regularization parameters. A logarithm is used in this case for the response variable to keep the predictions positive.

The outputs of the propensity module 302 and the buy size module 308 are then utilized by an expected value module 314 to generate an expected customer value 316 for the potential and/or existing customer being evaluated. For a potential customer, the expected value module 314 determines the expected customer value 316 utilizing the following:

Upsell Opportunity=Time frame Buy Size–Current Time frame ARR

Expected Value=Propensity to Buy*Upsell Opportunity

In the case of a potential customer, however, the Current Timeframe ARR is zero, as the potential customer has not yet purchased a product or service. The Upsell Opportunity then becomes equal to the Timeframe Buy Size, and the expected value 316 equals the Propensity to Buy*Timeframe Buy Size for a potential customer.

For an existing customer, the expected value module 314 determines the expected customer value 316 utilizing the following:

Upsell Opportunity=Time frame Buy Size–Current Time frame ARR

Expected Value=Propensity to Buy*Upsell Opportunity

Therefore, the expected customer value 316 for existing customers takes into account products and services already purchased by the existing customers by removing the Current Timeframe ARR from the Timeframe Buy Size. In this way, more accurate metrics are provided than those provided by conventional systems, as a difference in resources for existing customers are accounted for in comparison to the resources needed for potential customers who do not yet have a history with the provider of the product or service.

In addition, the expected value module 314 may filter dimensions and characteristics of potential and existing customers for comparisons to other customers having similar characteristics in certain scenarios. In one example, the expected value module 314 may rank customers within each geographic category based on their expected values, or extract the expected values into different groups based on geographic categories. Other characteristics are also contemplated, such as industry, market area, specialties, and so forth.

The expected value module 314 may also be used to combine expected values for multiple products into a single expected value for a particular customer. An overall expected value may be obtained by taking the sum of the expected customer value 316 of each product or service. Assuming there are n total products and/or services, the following may be used to generate an overall expected value for a potential or existing customer:

Overall expected value =
$$\text{Expected\_value}_1 + \text{Expected\_value}_2 + \ldots + \text{Expected\_value}_n$$

Overall propensity =
$$\frac{\text{Expected\_value}_1 + \text{Expected\_value}_2 + \ldots + \text{Expected\_value}_n}{\text{Upsell}_1 + \text{Upsell}_2 + \ldots + \text{Upsell}_n}$$

Overall upsell opportunity = $\text{Upsell}_1 + \text{Upsell}_2 + \ldots + \text{Upsell}_n$ By aggregating the expected value of different products in this way, ratings between different customers associated with different targeted product amounts can be compared on a unified scale that is easy for users to interpret and understand.

A rating determination module 318 receives the expected customer value 316 and uses the expected customer value to generate a customer rating 124. The rating determination module 318 may also be implemented as a rating output module, which outputs the customer rating 124 to the service provider system 102 of FIG. 1. To generate the customer rating 124, the rating determination module 318 may compare the expected customer value 316 to an interval of quantile of expected value, where the interval is chosen based on a specific business need. In other words, the expected customer value 316 can be compared to threshold values for different ratings. The rating determination module may be configured to generate symbol ratings that correspond to different threshold values. For instance, one symbol may correspond to a first set of threshold values, two symbols correspond to a second set of threshold values, and so forth. One example of a symbol rating is a star rating system having five possible stars. The star rating system in this example maps a relationship between quantiles of the expected customer value 316 to a corresponding star rating, and is provided in Table 1:

TABLE 1

| Quantile | Star Rating |
| --- | --- |
| (0, 0.9) | |
| (0.9, 0.94) | * |
| (0.94, 0.97) | ** |
| (0.97, 0.985] | *** |
| (0.985, 0.995] | **** |
| (0.995, 1] | ***** |

The quantile values provided in Table 1 are meant only as examples, and any values may be used to delineate ratings that visually convey an expected customer value based on different business needs. Furthermore, using the aggregation of multiple products described above, the rating determination module 318 may incorporate various quantities of products into a single customer rating 124 such that ratings of multiple customers can be easily compared, one to another, despite having different numbers of targeted products.

Figure 4:
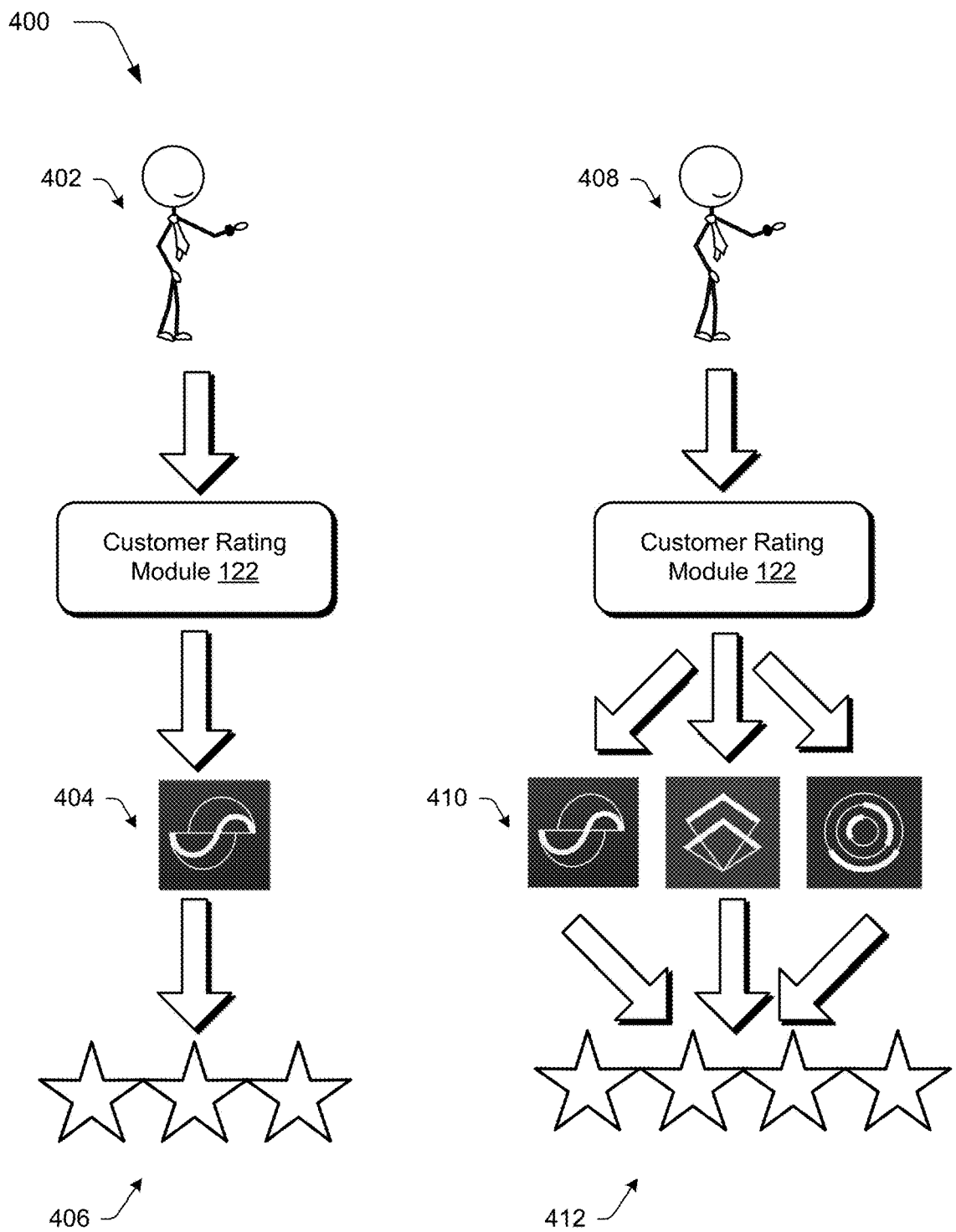
FIG. 4 depicts a system in an example implementation utilizing a customer rating module of FIG. 1 to generate quantitative ratings of customers based on different quantities of products using the techniques described herein.

For example, consider FIG. 4, which depicts a system 400 utilizing the customer rating module 122 of FIG. 1 to generate quantitative ratings of customers based on different product amounts. The customer rating module 122 receives user interaction data as described above for a first customer 402. The customer rating module 122 determines an expected value of the first customer 402 based on customer propensity and buy size, such as by using firmographic data for the first customer and data associated with other customers. In this scenario, the customer rating module 122 determines the expected value for the first customer 402 for a single product 404 which is targeted towards the particular customer. Then, the customer rating module 122 generates a customer rating 406, which in this example is a star rating for the first customer 402. The customer rating 406 in this case is three stars, indicating the expected value for the first customer 402 should the first customer purchase the single product 406.

In another example, the customer rating module 122 receives user interaction data for a second customer 408, and determines an expected value of the second customer based on customer propensity and buy size as discussed in detail above. The customer rating module 122 determines the expected value for the second customer 408 for three products 410 which are targeted towards the particular customer. Then, the customer rating module 122 generates a customer rating 412, which in this example is also a star rating for the second customer 408 to be used in comparing with the customer rating 406 for the first customer 402. The customer rating 412 in this case is four stars indicating the expected value for the second customer 408 should the second customer purchase the three products. As can be seen from this example, even though the two different customers 402 and 408 are targeted for different numbers of products, their expected values can be compared quantitatively, one to another. This gives sales and marketing teams an efficient technique for comparing different customers and allocating accounts despite the customers being likely to purchase different products or services.

FIG. 5 depicts a variety of validation plots 500 of quantitative ratings systems as described herein for prioritizing customers by propensity to buy and buy size. While the validation plots 500 generally describe a year timeframe and a star rating, any suitable timeframe and type of rating is considered. In the following examples, the validation strategy used utilizes data from fiscal year 2016 to assign a projected star rating to fiscal year 2017. Then, the star rating results are compared with actual results from fiscal year 2017 for validation.

A first validation plot 502 depicts a first year expected value versus a star rating applied to potential customers. The first year expected value results from multiplication of conversion rate and average actual first year buy size, representing actual observations for propensity to buy and expected value. To determine the first year expected value, the following is used:

First year expected value =

Conversion rate $*$ Average actual first year buy size =

$$\frac{\text{Number of converted potential customers}}{\text{Number of potential customers in the given star category}} *$$

$$\frac{\text{Sum of actual first year buy size}}{\text{Number of converted potential customers}}$$

As seen in the first validation plot 502, an increase in star rating represents an increase in the observed first year expected value. Consequently, the star rating is consistent with a rank order of expected value for converted potential customers.

A second validation plot 504 depicts an actual conversion rate versus a star rating for customers in different star rating categories. For the second validation plot 504, the conversion rate is defined as:

Conversion rate =

$$\frac{\text{Number of converted potential customers}}{\text{Number of potential customers in the given star category}}$$

As shown in the second validation plot 504, as the star rating increases, conversion rate also increases significantly. This demonstrates that the star rating is an accurate ranking metric for targeting those potential customers that are most likely to convert.

A third validation plot 506 depicts an average actual first year buy size versus different star rating categories. For the third validation plot 506, the average actual first year buy size is defined as:

Average actual first year buy size =

$$\frac{\text{Sum of actual first year buy size}}{\text{Number of converted potential customers}}$$

The third validation plot 506 shows that a rank order for star ratings one to five is consistent with an increasing order of average first year buy size. The exception, however, is the "null" star category, which results from missing data associated with the evaluated customers. For example, some customers may not have sufficient features or characteristics to evaluate as a potential customer using the described techniques, and thus may not be able to be accurately targeted.

A fourth validation plot 508 depicts an average actual next year buy size versus different star rating categories. For the fourth validation plot 508, the average actual next year buy size is defined as:

$$\text{Average actual next year buy size} = \frac{\text{Sum of actual next year buy size}}{\text{Number of existing customers}}$$

The fourth validation plot 508 shows that existing customers with higher star ratings have larger average next year buy sizes. Therefore, star rating is effective at prioritizing existing customers.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
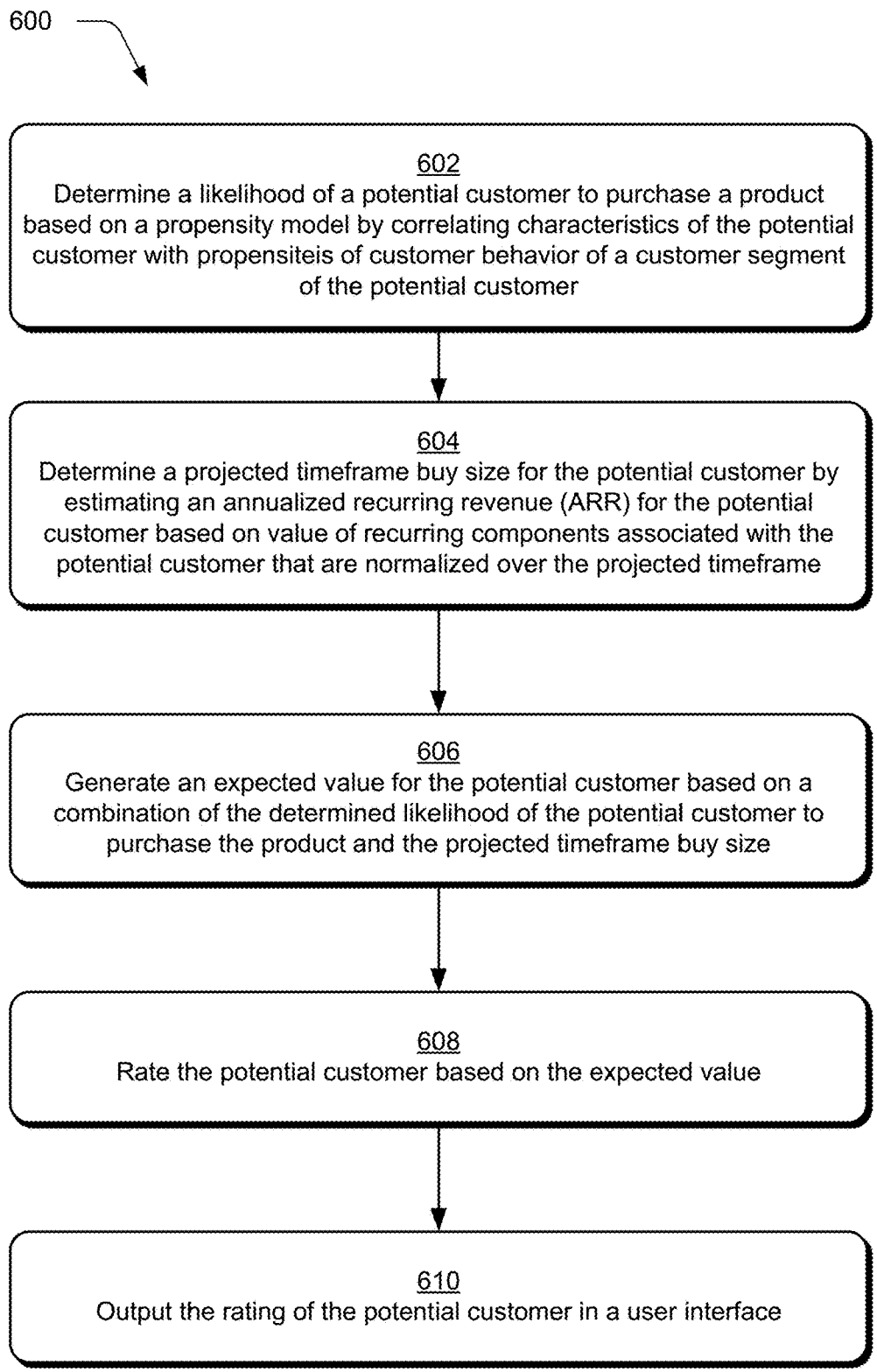
FIG. 6 is a flow diagram depicting a procedure in an example implementation in which a rating of a potential customer is output indicating an expected value of the potential customer in a user interface by a quantitative customer rating system.

FIG. 6 depicts a procedure 600 in an example implementation in which a rating of a potential customer is output indicating an expected value of the potential customer in a user interface by a quantitative customer rating system. A likelihood of a potential customer to purchase a product or service is first determined based on a propensity model by correlating characteristics of the potential customer with propensities of customer behavior of a customer segment of the potential customer (block 602). The propensity model may be logistic regression with a penalized term or a random forest model, to name a few examples. Next, a projected timeframe buy size for the potential customer is determined, by estimating an annualized recurring revenue (ARR) for the potential customer based on value of recurring components associated with the potential customer that are normalized over the projected timeframe (block 604). A look-alike model may be used to generate a timeframe buy size prediction for the potential customer. A timeframe for the projected timeframe buy size may be, for example, a first year following the potential customer purchasing the product or service. When evaluating multiple products or services for a potential customer, the likelihood of the potential customer to purchase the product or service and the projected timeframe buy size may be repeated for each product or service targeted towards the potential customer.

An expected value for the potential customer is generated based on a combination of the likelihood of the potential customer to purchase the product or service and the projected timeframe buy size (block 606). As discussed above, the expected value represents a quantitative prediction for the potential customer with significantly less human bias than is present in conventional systems. The expected value for the potential customer may represent one, or multiple, products that are targeted towards the potential customer by combining the propensity to buy and buy size for each product as described above. Additionally, the expected value may be refined based on a number of characteristics, such as geographic region and industry, to name a few examples.

The potential customer is then rated based on the expected value (block 608). The rating of the potential customer may be compared to ratings of other potential customers, one to another, despite the different potential customers being targeted different numbers of products. Then, a rating of the potential customer indicating the expected value is output in a user interface (block 608). In one example, a star rating generated by comparing the determined ratings of the respective customers to thresholds for different star amounts may be used in outputting the rating of the potential customer.

FIG. 7 depicts a procedure 700 in an example implementation in which a rating of an existing customer is output indicating an expected value of the existing customer in a user interface by a quantitative customer rating system. First, a timeframe buy size for an existing customer is determined using a ratio model of annualized recurring revenue (ARR) of the existing customer for consecutive time frames (block 702). A timeframe for the timeframe buy size may be, for example, a year following the existing customer purchasing the product or service. Accordingly, the consecutive time frames used for the ratio model of ARR may be, for instance, two consecutive years, although other time frames are also contemplated, such as two consecutive months, two consecutive weeks, and so forth. The timeframe buy size may represent one, or multiple, products or services to be targeted towards the existing customer.

An upsell opportunity for the existing customer is then determined based on the determined timeframe buy size less an ARR for a current timeframe for the existing customer (block 704). In other words, the up sell opportunity represents the ARR for the current timeframe subtracted from the timeframe buy size. Similar to the above, the upsell opportunity may represent one, or multiple, products or services to be targeted towards the existing customer accordingly. The upsell opportunity corresponds to an expected value for the existing customer.

Next, a rating of the existing customer indicating the upsell opportunity of the existing customer is determined (block 706), and the rating of the existing customer is output in a user interface (block 708). Similar to the discussion of potential customers, the rating of the existing customer may be compared to ratings of other existing customers, one to another, despite the different existing customers being targeted different numbers of products. In some cases, ratings of existing customers may also be compared to ratings of potential customers as well. The ratings of existing customers may also be output as star ratings generated by comparing the determined ratings of the respective customers to thresholds for different star amounts. In this way, a variety of different customer types each having different targeted products and services can easily and efficiently be compared without the human bias present in conventional systems.

Example System and Device

Figure 8:
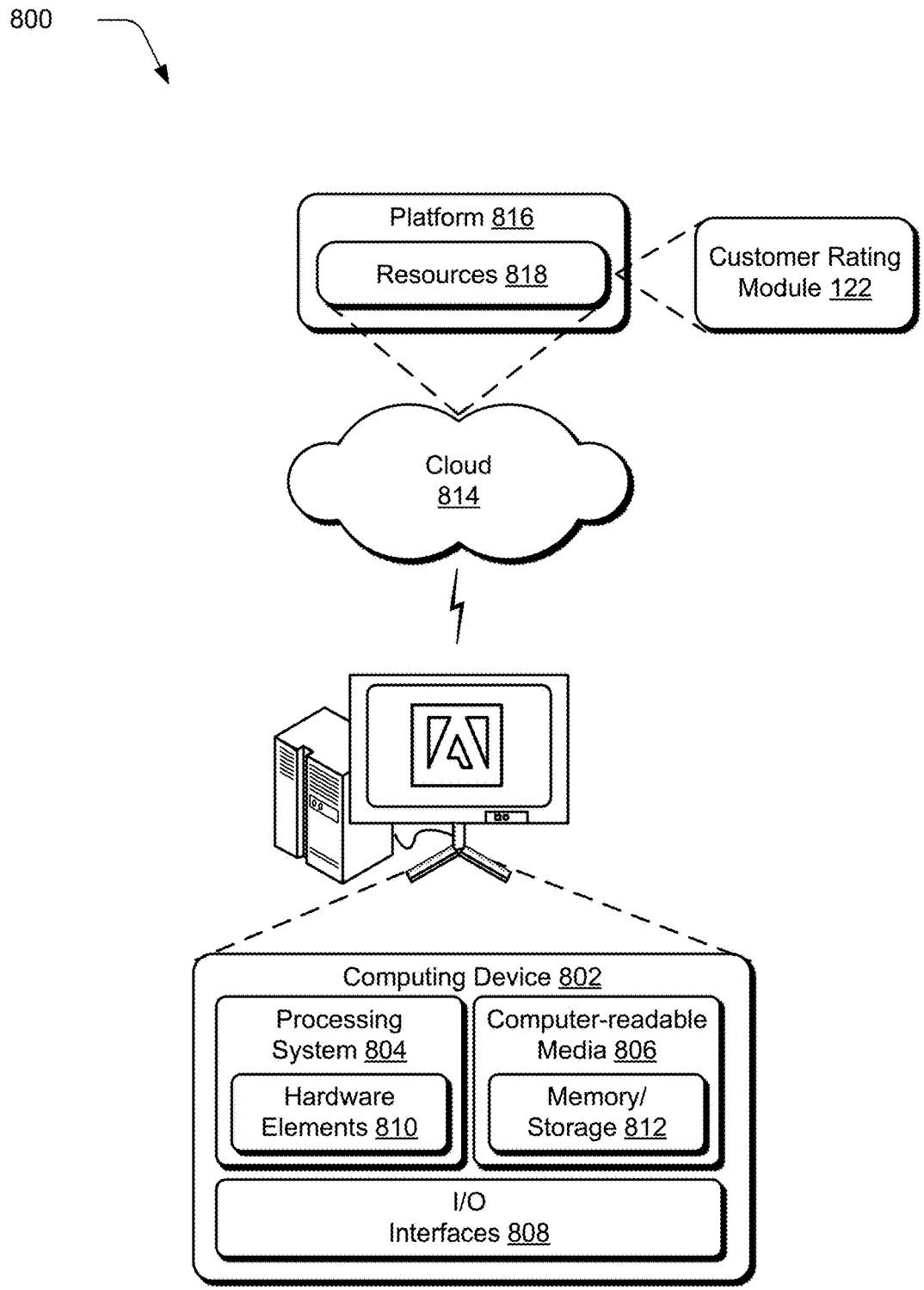
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the customer rating module 122. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, interaction data describing interaction of respective client devices with digital services implemented by a service provider system via a network and resource allocation of resources implemented by processing devices of the service provider system in providing the digital services; and
   determining, by the processing device, a subsequent resource allocation of the resources implemented by the processing devices of the service provider system in providing the digital services based on the interaction data, the determining including:
      determining, by the processing device, a timeframe buy size for an entity using a statistically biased asymmetrical ratio model of annualized recurring revenue (ARR) of the entity for consecutive time frames, the ratio model applied with an elastic-net regression to fit the ratio model by linearly combining penalties of the ratio model;
      determining, by the processing device, an upsell opportunity for the entity by subtracting an ARR for a current timeframe for the entity from the determined timeframe buy size;
      generating, by the processing device, a quantitative rating for the entity based on the upsell opportunity for the entity;
   allocating, by the processing device, the resources implemented by the processing devices of the service provider system in providing the digital services based on the timeframe buy size, the allocating implementing the subsequent resource allocation;
   generating, by the processing device, digital content to be communicated over a network to the entity based on the quantitative rating using the allocated resources implemented by the processing devices, the digital content specifying at least one said digital service able to be accessed via the network from the service provider system; and
   providing, by the processing device, access to the at least one said digital service via the network using the allocated resources implemented by the processing devices responsive to interaction with the digital content.

2. The method of claim 1, wherein the upsell opportunity of the entity represents an expected value of the entity.

3. The method of claim 1, further comprising:
   determining additional upsell opportunities for the entity by taking additional ARRs for the current timeframe for the entity from additional determined timeframe buy sizes for the entity; and
   combining the additional upsell opportunities for the entity into an overall upsell opportunity for the entity.

4. The method of claim 1, further comprising filtering characteristics of the entity for comparison to other entities having similar characteristics.

5. The method of claim 4, wherein the characteristics of the entity include a geographic location.

6. The method of claim 1, wherein the quantitative rating of the entity is determined by comparing the upsell opportunity of the entity to threshold values for different ratings.

7. The method of claim 6, wherein the quantitative rating of the entity is output as a symbol rating, where different numbers of symbols of the symbol rating correspond to respective ones of the threshold values.

8. A system comprising:
   a memory component; and
   a processing device coupled to the memory component, the processing device to perform operations comprising:
      receiving interaction data describing interaction of respective client devices with digital services implemented by a service provider system via a network and resource allocation of resources implemented by processing devices of the service provider system in providing the digital services; and
      determining a subsequent resource allocation of the resources implemented by the processing devices of the service provider system in providing the digital services based on the interaction data, the determining including:
         determining multiple timeframe buy sizes for an entity using a ratio model of annualized recurring revenues (ARR) of the entity for consecutive time frames, the ratio model applied with an elastic-net regression to determine the multiple timeframe buy sizes;
         determining multiple upsell opportunities for the entity by taking ARRs for a current timeframe for the entity from the determined multiple timeframe buy sizes;
         combining the multiple upsell opportunities for the entity into an overall upsell opportunity for the entity;
         generating a quantitative rating for the entity based on the overall upsell opportunity for the entity;
      allocating the resources implemented by the processing devices of the service provider system in providing the digital services based on the overall upsell opportunity, the allocating implementing the subsequent resource allocation;
      generating digital content to be communicated over a network to the entity based on the quantitative rating using the allocated resources implemented by the processing devices, the digital content specifying at least one said digital service able to be accessed via the network from the service provider system; and providing access to the at least one said digital service via the network using the allocated resources implemented by the processing devices responsive to interaction with the digital content.

9. The system of claim 8, wherein the overall upsell opportunity of the entity represents an expected value of the entity.

10. The system of claim 8, further comprising filtering characteristics of the entity for comparison to other entities having similar characteristics.

11. The system of claim 10, wherein the characteristics of the entity include a geographic location.

12. The system of claim 8, wherein the quantitative rating of the entity is determined by comparing the overall upsell opportunity of the entity to threshold values for different ratings.

13. The system of claim 8, wherein the ratio model is a statistically biased and asymmetrical ratio model.

14. The system of claim 8, wherein the ratio model is applied with the elastic-net regression to fit the ratio model by linearly combining penalties of the ratio model.

15. A non-transitory computer-readable medium storing executable instructions, which when executed by a processing device, the processing device performs operations comprising:
receiving interaction data describing interaction of respective client devices with digital services implemented by a service provider system via a network and resource allocation of resources implemented by processing devices of the service provider system in providing the digital services; and
determining a subsequent resource allocation of the resources implemented by the processing devices of the service provider system in providing the digital services based on the interaction data, the determining including:
determining a timeframe buy size for an entity using a ratio model of annualized recurring revenue (ARR) of the entity for consecutive time frames, the ratio model applied with an elastic-net regression to determine the timeframe buy size;
determining an upsell opportunity for the entity by subtracting an ARR for a current timeframe for the entity from the determined timeframe buy size;
generating a quantitative rating for the entity based on the upsell opportunity for the entity;
allocating the resources implemented by the processing devices of the service provider system in providing the digital services based on the timeframe buy size, the allocating implementing the subsequent resource allocation;
generating digital content to be communicated over a network to the entity based on the quantitative rating using the allocated resources implemented by the processing devices, the digital content specifying at least one said digital service able to be accessed via the network from the service provider system; and
providing access to the at least one said digital service via the network using the allocated resources implemented by the processing devices responsive to interaction with the digital content.

16. The non-transitory computer-readable medium of claim 15, wherein the upsell opportunity of the entity represents an expected value of the entity.

17. The non-transitory computer-readable medium of claim 15, further comprising filtering characteristics of the entity for comparison to other entities having similar characteristics.

18. The non-transitory computer-readable medium of claim 17, wherein the characteristics of the entity include a geographic location.

19. The non-transitory computer-readable medium of claim 15, wherein the quantitative rating of the entity is determined by comparing the upsell opportunity of the entity to threshold values for different ratings.

20. The non-transitory computer-readable medium of claim 15, wherein the elastic-net regression the ratio model is applied with the elastic-net regression to fit the ratio model by linearly combining penalties of the ratio model.

* * * * *